Oct. 5, 1965

R. L. McGLASSON ETAL 3,210,655

ELECTROLYTE METHOD AND APPARATUS FOR DETECTING HOLIDAYS IN THE INTERNAL COATINGS OF PIPES

Filed Aug. 29, 1960

ROBERT L. McGLASSON
JAMES E. LANDERS
WALTON D. GREATHOUSE
EARL D. GOULD
*INVENTORS.*

BY

*Jerome B. Peterson*

ATTORNEY

ROBERT L. McGLASSON
JAMES E. LANDERS
WALTON D. GREATHOUSE
EARL D. GOULD
*INVENTORS.*

BY
Jerome B. Peterson
*ATTORNEY*

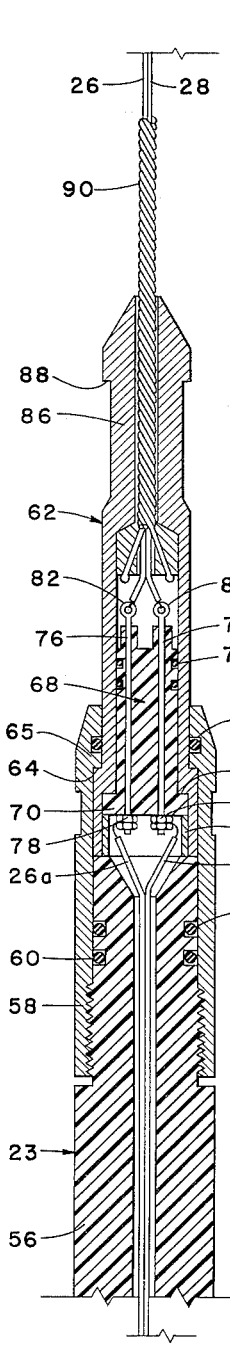
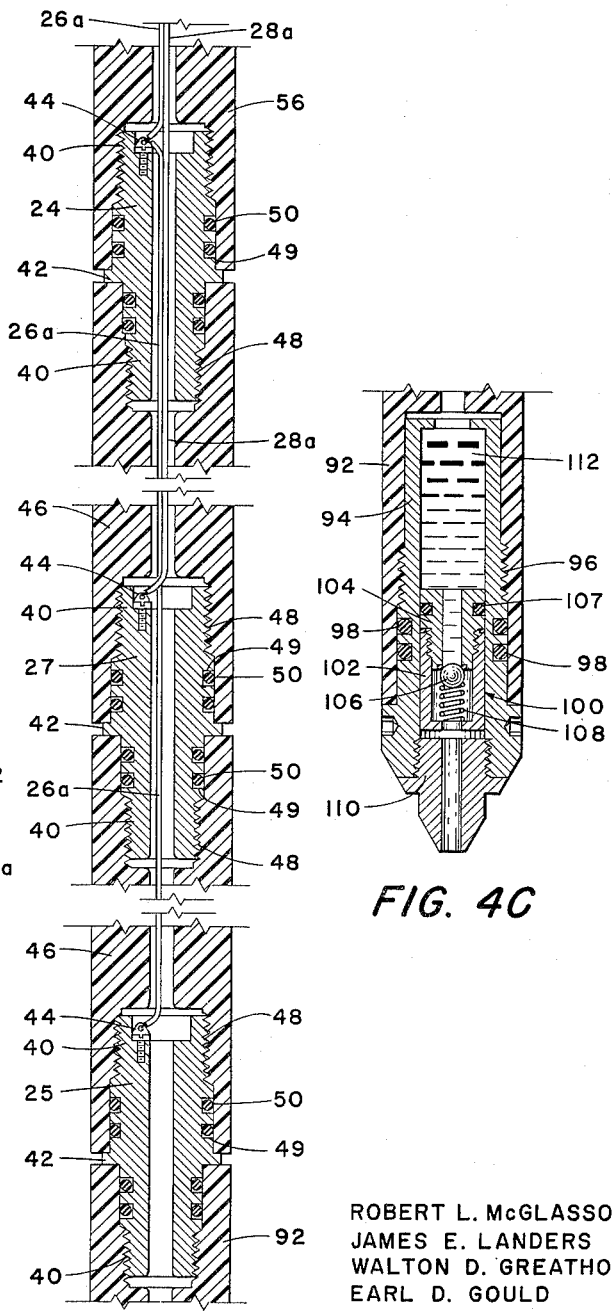
FIG. 4A   FIG. 4B   FIG. 4C

United States Patent Office 3,210,655
Patented Oct. 5, 1965

3,210,655
ELECTROLYTE METHOD AND APPARATUS FOR DETECTING HOLIDAYS IN THE INTERNAL COATINGS OF PIPES
Robert L. McGlasson, James E. Landers, and Walton D. Greathouse, Ponca City, Okla., and Earl D. Gould, Metairie, La., assignors to Continental Oil Company, Ponca City, Okla., a corporation of Delaware
Filed Aug. 29, 1960, Ser. No. 52,585
7 Claims. (Cl. 324—54)

This invention relates to a method and apparatus for detecting and locating breaks or imperfections in a relatively non-conducting or insulating coating material applied to the surface of a conducting material. More particularly, but not by way of limitation, the present invention relates to a method and apparatus for testing an internal pipe coating for the purpose of locating holidays therein.

The particular problem to which this invention has been applied in the preferred embodiment depicted and described herein is that of testing coatings of the type applied to the internal walls of oil well tubular members, such as tubing and casing.

There are an increasing number and variety of uses for metal goods which are protected by thin coatings of non-reactive and relatively non-conducting materials, such as plastics, paint and rubber. The coating serves to protect the metal from chemical attack by corrosive substances with which it would otherwise be in contact, and also to protect the metal substrate from the corrosive effects of electrolysis due to cathodic currents which may be developed between the surrounding medium and the metal. In oil wells particularly, piping which has an interior coating of plastic or rubber is finding an increased use. Such coatings protect the pipe from corrision resulting from chemical combination with the fluids passing through the piping and also from the erosion which tends to result from the wearing action of solids entrained in the fluid passing upwardly through the pipe.

After extended periods of use, the internal coating of such piping may become pitted or scored to the extent that portions of the underlying metal may be exposed to the action of the fluids contained within the pipe. The breaks or imperfections in the coating material will hereinafter be termed "holidays," and may be caused by a number of factors including extensive wear and erosion caused by solids entrained in the passing fluid, shrinkage cracks in the coating, and imbedding of particles of coke or silica.

Since the development of holidays in the pipe coating allows the underlying metal to be subjected to the detrimental influence of the fluid contained within the pipe, the purpose of such coatings will be defeated unless the location of such holidays can be determined and the coating layer restored at that point. It is therefore desirable to frequently test the internal walls of the pipe for the purpose of determining if holidays exist in the coating material, and if such holidays exist, to determine as closely as possible their location within the pipe.

Several methods have previously been suggested for determining the location of holidays in an insulating coating applied to tubing. In one type of apparatus previously utilized for this purpose, a high alternating potential is developed adjacent the coated surface and the pipe. Where an imperfection exists, a spark will jump from the probe surrounding the pipe through the imperfection in the coating to the steel pipe and thus indicate the presence of the holiday. This particular method and apparatus of testing the pipe coating for holidays has been characterized by several disadvantages which render its use less attractive in some situations and impractical in others. Thus, it is necessary to provide electrical apparatus capable of developing alternating potentials of from 5,000 to 20,000 volts, which constitutes a safety hazard, is capable at its upper limit of rupturing the good portions of the coating, and is relatively inaccurate in determining the exact location of very small holidays. Moreover, the disposition of most such devices with respect to the pipe which is under test requires that the pipe not be located in a well, but rather be lying on the surface where its external and internal surfaces are accessible.

Whether the piping is located in place in the earth or is at the surface, visual inspection of an internal coating is usually impossible because of the dimensions of the tubing. If the tubing is located in an oil well, caliper surveys of the internal coating for the purpose of locating holidays or imperfections is a possibility. This method of holiday detection, however, is not sufficiently accurate to detect extremily small holidays and, still worse, the calipering instrument in contacting the walls of the tubing may itself flake off particles of the protective coating.

The present invention may be broadly defined as an apparatus for locating holidays in an internal coating of insulating material in an electrically conductive tubular member, comprising an electrolyte filling the tubular member, electrode means, means for moving the electrode means lengthwise through the tubular member and the electrolyte out of physical contact with said coating, means for imposing different potentials on the electrode means and the tubular member, and means for registering variations in a parameter of the resistance between the electrode means and the tubular member during movement of the electrode means through the tubular member.

In one of its more specific aspects, the present invention contemplates a method and an apparatus for registering variations in the electrical potential which exists between a holiday in a pipe coating and a probe as the latter traverses an electrolyte-filled section of the piping. As the probe is moved axially through the pipe, the potential difference existing between the metal of the pipe and the probe is continuously indicated by a potential measuring instrument, and the potential thus indicated is continuously recorded as a function of the distance of the probe from one end of the pipe. Sharp, clearly-defined changes in the registered potential show that the resistance between the probe and the pipe changes at that point, thus indicating the presence of a holiday in the vicinity of the probe and permitting its location in the pipe to be accurately determined.

In a preferred embodiment of the present invention, the electrical probe which is suspended in the pipe comprises a pair of spaced apart electrodes connected to one terminal of a source of electromotive force and a third electrode located approximately midway between the first-mentioned pair of electrodes and connected to the other terminal of the source of electromotive force. In this manner, a potential gradient is established between the centrally located electrode and the two electrodes on either side thereof. This gradient is, of course, three-dimensional in nature so that it extends outwardly in the electrolyte solution on all sides of a line directly connecting adjoining electrodes. It thus extends to, and contacts, the internal coating of the piping. A potential measuring device is connected between one of the electrodes and the metal of the pipe so that as the electrodes and their included potential gradient are moved past a holiday in the coating, a variation in the potential indicated by the potential measuring device will occur which is directly related to the location of the holiday in the potential gradient. It is therefore possible by the method of the present invention to establish a correlation between the potential thus indicated and the location of the electrodes relative to the pipe.

A major object of the present invention is to present a method and apparatus for determining the existence and location of holidays in relatively non-conducting coating materials so that the coating will not be damaged during such determination and so that holidays of extremely small dimensions may be located.

Another object of the present invention is to provide a method and apparatus for determining the location of holidays in an internal coating of oil well piping which is in place in the ground without the necessity of pulling sections of the pipe for purposes of conducting the test.

A further object of the present invention is to provide an apparatus for electrically determining the presence of holidays in an internally coated pipe, which apparatus is safe in operation and extremely sensitive in use and therefore responsive to the presence of holidays of minute dimensions.

An additional object of this invention is to provide a method of detecting holidays in the coating of a pipe which is easily practiced and subject to mastery by individuals lacking technical training.

Another object of this invention is to provide a device for detecting and locating holidays in the coating of tubing and piping, which device is simple, yet relatively rugged in construction, may be economically manufactured, and will have a long service life.

Other objects and advantages of the invention will be evident from the following detailed description, when read in conjunction with the accompanying drawings which illustrate our invention.

In the drawings:

FIGURES 4A, 4B and 4C are, respectively, vertical sectional views through the upper, central and lower portions of a three-electrode probe constructed in accordance with this invention.

Figures 1, 5:
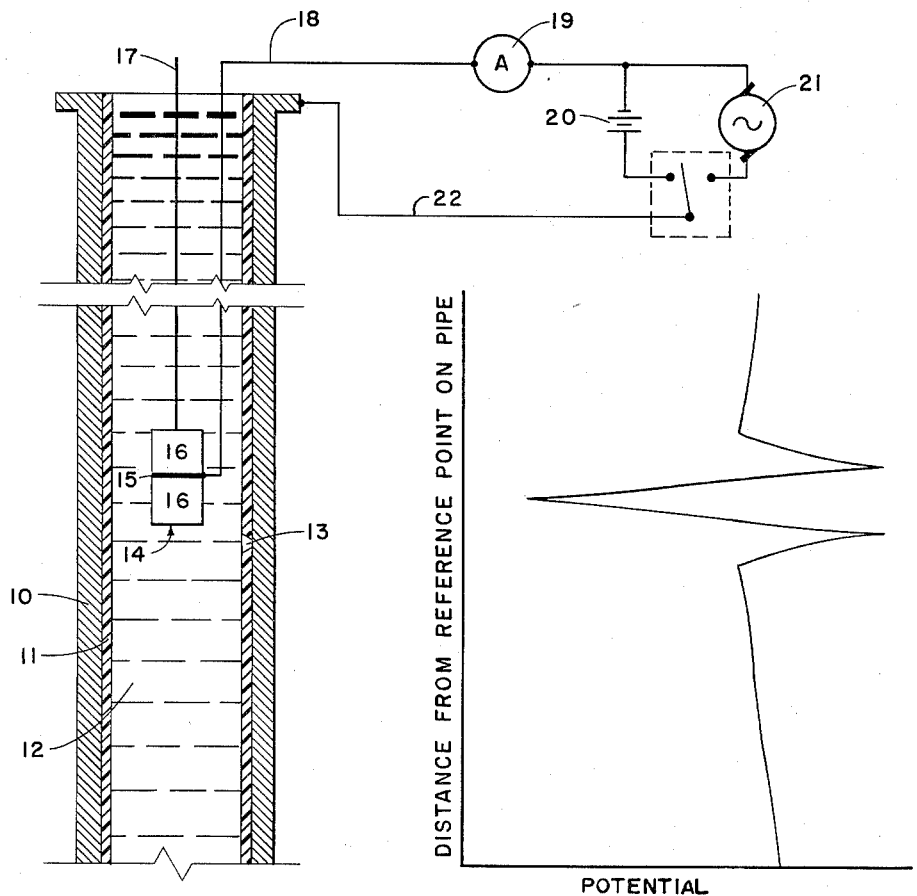
FIGURE 1 is a schematic view showing a single electrode probe and its associated circuit with the probe disposed inside an electrolyte-filled pipe.
FIGURE 5 shows the manner in which the location of a holiday in a coating may be graphically determined using data obtained by the method and device of this invention.

Referring to the drawings in detail, and particularly to FIG. 1, a section of oil well pipe (such as tubing or casing) is designated by reference character 10. The pipe is internally coated with an insulating material, as indicated by reference character 11 and is filled with an electrolytic fluid 12, such as ordinary oil field water. A break or holiday in the coating 11 is indicated by reference character 13. A probe, generally indicated by reference character 14, comprises an electrode 15 of conductive material sandwiched between portions of insulating material 16. The probe is raised and lowered in the pipe 10 by a cable 17 or other suitable means.

An electrical lead 18 connects the electrode 15 through an ammeter 19 to one terminal of a source of electromotive force which may be either a source of direct current 20 or alternating current 21. The other terminal of the source of E.M.F. is connected by lead 22 to pipe 10 at the wellhead or other convenient point.

Figures 2, 3:
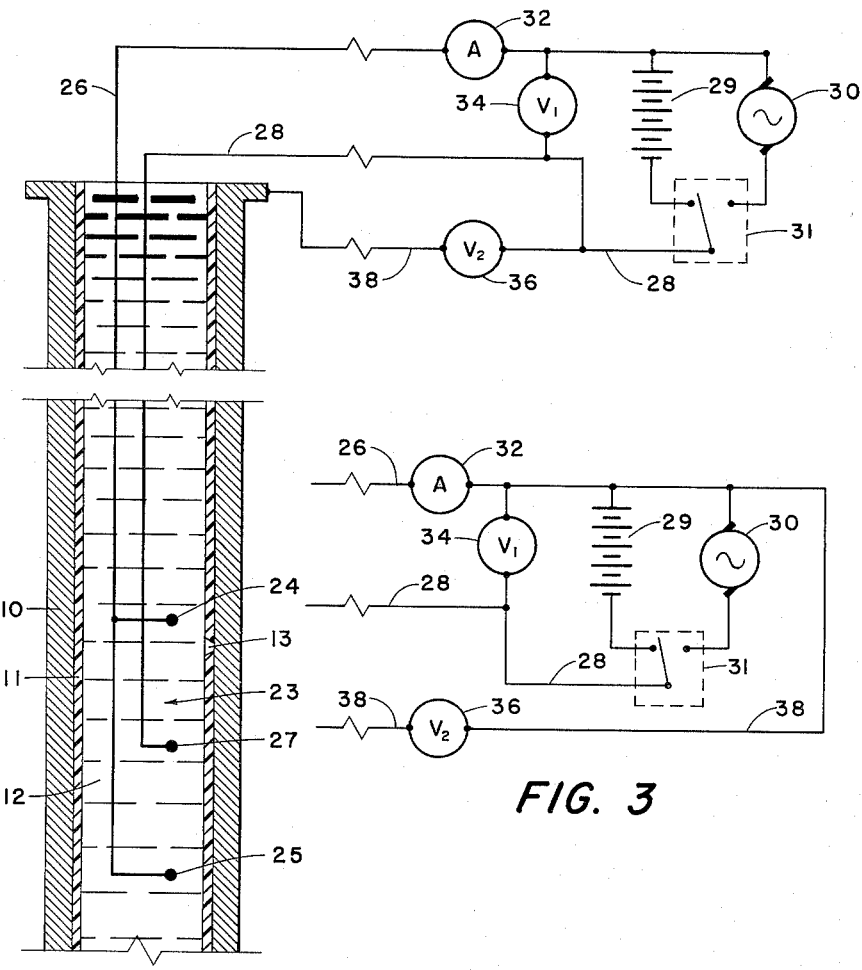
FIGURE 2 is a schematic view showing a three-electrode probe disposed inside an electrolyte-filled, internally coated pipe, and further showing an electrical circuit which may be utilized with the three-electrode probe to detect holidays in the coating.
FIGURE 3 illustrates a different electrical circuit which may be utilized in conjunction with the three-electrode probe for the detection of holidays in the pipe coating material.

FIG. 2 illustrates a three-electrode probe which is capable of detecting and locating holidays of considerably smaller dimension than those which can be sensed with the single electrode apparatus of FIG. 1. In FIG. 2, the pipe, its coating, the electrolytic fluid and the holiday in the coating bear the same reference characters as in FIG. 1. A three-electrode probe, designated generally by reference character 23, is suspended in the pipe by any suitable means. The probe 23 comprises a pair of electrodes 24 and 25 connected via lead 26 to a common terminal of a source of electromotive force, and a third electrode 27 which is connected via lead 28 to the other terminal of the source of electromotive force. Electrode 27 is disposed approximately midway between electrodes 24 and 25 and is linearly aligned therewith. As in the case of the circuit shown in FIG. 1, the source of E.M.F. may be either a source of direct current, as indicated by reference character 29, or may be a source of alternating current as indicated by reference character 30. A switch 31 may be utilized in the circuit to allow the direct current source 29 or the alternating current source 30 to be used alternately as power availability may dictate. To facilitate adjusting the current passing through, and the voltage impressed across, the circuit, an ammeter 32 and a voltmeter 34 are connected to the circuit at appropriate locations. A second voltmeter 36 is connected between lead 28 and pipe 10 by means of electrical lead 38.

FIG. 3 illustrates an alternative circuit arrangement which may be utilized in conjunction with the three-electrode probe depicted in FIG. 2. As shown in FIG. 3, the voltmeter 36 is connected between the pipe 10 and the terminal of the source of electromotive force to which the electrodes 24 and 25 are connected. In all other aspects the circuit depicted in FIG. 3 is identical to that depicted in FIG. 2.

A preferred construction of the three-electrode probe 23 of the present invention is illustrated in FIGS. 4A, 4B and 4C. In FIG. 4A, approximately the upper one-third of the probe is illustrated. FIG. 4B depicts the central portion of the probe and shows the three electrodes 24, 27 and 25 as they are maintained in spaced apart relation. FIG. 4C shows the lower end of the probe.

Referring first to the central and main portion of the probe as shown in FIG. 4B, the three electrodes are designated generally by reference characters 24, 25 and 27 in the same manner as in FIG. 2. Each of the electrodes 24, 25 and 27 is generally tubular in configuration and is threaded at each of its ends, as indicated by reference numeral 40. Intermediate its length, each electrode carries a circumferential flange or shoulder 42. At its upper end, each of the electrodes 24, 25 and 27 has a terminal 44 to which may be connected an appropriate electrical lead as indicated schematically in FIG. 2.

The three electrodes 24, 25 and 27 are coaxially aligned with each other in axially spaced apart relation and are connected together by a pair of insulating spacing members 46. The spacing members 46 are also tubular in shape and have axial bores which are enlarged at each end to a diameter of sufficient size to receive the end portions of the electrodes 24, 25 and 27. The internal walls of the enlarged bore at each end of each spacing member 46 is threaded, as indicated by reference numeral 48, so that the respective end portions of electrodes 24, 25 and 27 may threadedly engage the internal walls when they are inserted therein. Moreover, each of the insulating spacing members 46 is of substantially the same length so that the central electrode 27 is spaced approximately midway between electrodes 24 and 25.

Each of the electrodes 24, 25 and 27 has a pair of parallel circumferential grooves 49 extending around its outer wall and located on each side of the shoulder 42 for the accommodation of O-ring seals indicated by reference character 50. When the electrodes 24, 25 and 27 have been screwed into place in their respective spacing members, the O-ring seals 50 bear against the internal walls of the spacing members to provide seals preventing the ingress of electrolytic fluid to the axial bore of the probe.

A slightly different type of insulating spacer member 56 is connected to the upper end of electrode 24 and, as shown in FIG. 4A, extends upwardly therefrom to make threaded engagement at its upper end with an internally threaded sleeve nut 58. A pair of O-ring seals 60 is provided between spacing member 56 and sleeve nut 58 for the purpose of preventing leakage of electrolytic fluid from outside the probe past the threads of the sleeve nut and spacing member and into the internal bore of the probe. A fishing neck 62 extends upwardly from the insulating spacing member 56 and is retained in abutting relation thereto by the sleeve nut 58. The fishing neck 62 is generally tubular in configuration and is coaxially aligned with the tubular spacing member 56. At its lower end, the fishing neck 62 is flared outwardly to provide a shoulder 64 which is engaged by a cooperating flange 65 on the sleeve nut 58. An O-ring seal 66 is located between the sleeve nut 58 and fishing neck 62 to prevent leakage of the electrolyte into the internal bore of the probe.

A cylindrical seal plug 68 is positioned in the lower portion of the bore of the tubular fishing neck 62 and is limited in upward movement by a head 70 formed on the lower end of the plug contacting an internal shoulder 72 in the fishing neck 62. It will be apparent that the plug 68 may be formed of any desired insulating material and is sealed in the fishing neck 62 by suitable sealing rings 73, such as O-rings. The seal plug 68 is prevented from moving down by an annular spacer 74 inserted between the flanged head 70 of the seal plug 68 and the insulating spacing member 56. A pair of terminal posts 76 and 77 extend through the seal plug 68 in an axial direction with respect to fishing neck 62. The lower ends 78 and 80 of the terminal posts 76 and 77, respectively, project downwardly from the lower end of the seal plug 68, and the upper ends 82 and 84 of the terminal posts 76 and 77, respectively, extend upwardly from the upper end of the seal plug.

The upper portion 86 of the tubular fishing neck 62 carries an external circumferential flange 88 to permit the probe to be retrieved from the pipe by a fishing tool of suitable type. The portion of the axial bore of the tubular fishing neck 62 which extends through its upper portion 86 is of lesser diameter than the communicating portion of the axial bore which contains seal plug 68. An armored cable 90, which encloses leads 26 and 28, passes through the reduced axial bore extending through the upper portion 86 of fishing neck 62 and is suitably anchored inside the portion of the bore of fishing neck 62 which contains the seal plug 68. The leads 26 and 28 extend past the anchor point of armored cable 90 and are connected to the upper ends 82 and 84 of terminal posts 76 and 77, respectively.

An electrical lead 26a is connected to the lower end 78 of terminal post 76 and extends through the aligned axial bores of spacing member 56, electrode 24, upper spacing member 46, electrode 27 and lower spacing member 46 to make connection with the contacts 44 of electrodes 24 and 25. An electrical lead 28a is connected to the lower end of terminal post 77 and, like lead 26a, extends through the aligned axial bores of the several spacing members and electrodes and is connected at its lower end to the contact 44 of electrode 27.

Referring now to FIG. 4C of the drawings, the lower portion of the three-electrode probe of the present invention is illustrated. An insulating, spacing member 92 is threadedly connected at its upper end to the lower end of electrode 25 and has a bore of varying diametric dimension extending throughout its length. The upper end of the bore is enlarged to receive the lower end of the electrode 25 therein and the lower end of the bore is enlarged to receive a tubular nose cap 94 which forms a cylinder, as described below.

The nose cap 94 threadedly engages the spacing member 92, as shown at 96, and also carries circumferential O-rings 98 which make sealing engagement with the internal walls of the spacing member 92 to prevent the ingress of electrolyte to the bore of the probe. The nose cap 94 is characterized by a large axial bore, and slidingly inserted in the bore of the nose cap is a ball check valve assembly designated generally by reference character 100. The ball check valve assembly 100 comprises a blind cage 102 threadedly connected to a seat 104 and housing a ball valve 106. An O-ring seal 107 is mounted in a groove extending around the periphery of seat 104 to slidingly and sealingly engage the internal wall of nose cap 94. A compression spring 108 is disposed between the ball valve 106 and the bottom of the blind cage 102 and resiliently urges the ball valve 106 into sealing contact with the seat 104. A nose cone 110 is threadedly attached to the lower end of nose cap 94 and is generally conical in shape to minimize the possibility of the apparatus being lodged on a shoulder (not shown) in any tubular member through which the apparatus may be lowered.

It will be observed, in referring to FIG. 4C, that the ball check valve assembly 100 is slidingly sealed in the nose cap 94 by the contact of O-ring seal 107 with the internal walls of the nose cap. Suitable insulating oil 112 (shown only in the nose cap 94) extends from the valve assembly 100 through the various axial bores in the probe 23 to the seal plug 68. Since ball check valve assembly 100 is slidingly mounted in the nose cap 94, it may be biased upwardly in the bore under the influence of pressure exerted by the electrolytic fluid surrounding the probe when the probe is lowered to the bottom of the well containing the pipe being inspected. This feature of the probe assures that the oil contained within the axial bore of the probe will, at all times, exert a pressure against all seals which is substantially equivalent to the pressure of the surrounding electrolytic fluid.

On the other hand, when the probe is lowered to a considerable depth in a string of oil well piping, the temperature of the surrounding electrolytic fluid may become quite high, with the result that the oil contained in the axial bore of the probe will undergo expansion to an undesirable extent. To relieve the pressure within the probe which may result from excessive heating of the insulating oil contained therein, the ball valve 106 is provided to permit the escape of the insulating oil to the outside of the probe as bottom-hole temperature conditions may require.

It will be noted, in referring to FIG. 4B, that the insulating spacing members are of slightly greater outside diameter than the outside diameter of the electrodes 24, 25 and 27 measured through their annular flange portions 42. This design affords protection against undesirable contact of the electrodes with the internal wall of the pipe. The diameteric dimensions of the probe must also, of course, be such as to easily pass through the size of pipe being examined. Optimum results are obtained when the outside diameter of the spacing members is approximately eighty percent of the internal diameter of the pipe, but other relative dimensions are workable.

*Operation*

In the operation of the single-electrode probe shown in FIG. 1, the internally coated pipe 10 is initially filled with an electrolytic fluid 12. Oil field waters may conveniently be employed. The probe 14 is then lowered by the cable 17 into the pipe 10, and as the probe is moved axially through the pipe, a record is constantly maintained of its distance from some reference point on the piping. This point may conveniently be the bottom or top of the well, or any other point from which it is possible to easily measure the distance to the probe.

As the probe 14 moves axially through the pipe 10, its distance from a holiday 13 in the coating 11 will increase or decrease. Moreover, as the probe 14 traverses the pipe 10 and approaches and passes a holiday 13, the location of the holiday relative to the electrode 15 of the probe will be indicated by a change in the resistance between the electrode 15 and the pipe 10, which will in turn be indicated by a change in the current flowing through the circuit. Such changes in current are indicated by ammeter 19, and the current readings obtained as the probe 14 changes its location with respect to the holiday 13 are plotted against the distance of the probe from the top, bottom or other known reference point in the pipe 10. It will be apparent, in referring to FIG. 1, that the current which flows through the circuit will reach a maximum value when the electrode 15 is even with and directly opposite the point at which the holiday 13 is located in the coating 11. In this manner the distance of the holiday from the top or bottom of the pipe 10 may be easily determined.

Although the single-electrode probe 14 depicted in FIG. 1 works very well when the size of holiday to be detected exceeds a certain minimum size, such single-electrode probes are limited in sensitivity and sometimes cannot detect holidays of less than 30 or 40 mils diameter.

The triple-electrode probe 23 depicted in FIG. 2 is substantially less limited in its ability to detect minute holidays in pipe coatings. The three-electrode probe 23 is schematically illustrated as it is passing by holiday 13 in the coating 11 of pipe 10. By virtue of the circuitry depicted in FIG. 2, an electrical potential difference is produced between electrodes 24 and 27 and between electrodes 25 and 27. A potential gradient is therefore also established between electrodes 24 and 27 and between electrodes 25 and 27. This gradient exists in the electrolytic fluid 12 in the configuration of a three-dimensional field in much the same way that a magnetic field exists. It therefore extends to and includes the coating 11. As the probe 23 is passed axially through the pipe 10, any holiday 13 which exists in the coating 11 will be passed by the potential gradient existing between the electrodes. Assuming that the holiday 13 is in the potential gradient, a potential difference exists between the holiday and any one of the electrodes 24, 25 or 27 which is directly related to the distance of the holiday 13 from the particular electrode. Thus, if a potential meausring device, such as a voltmeter, were connected between electrode 27 and holiday 13, the potential difference recorded by the voltmeter would vary from a maximum when the holiday 13 was directly opposite electrode 24 to a minimum when the holiday was directly opposite electrode 27 and back to a maximum when the holiday was directly opposite electrode 25.

This connection of a potential measuring device between electrode 27 and holiday 13 is, in effect, accomplished by the electrical circuitry illustrated in FIG. 2. Thus, one terminal of voltmeter 36 has been connected via electrical lead 28 to electrode 27, and the other terminal of the voltmeter has been connected via lead 38 to the pipe 10 which, of course, provides an electrically conductive path to the holiday 13. With this arrangement, the potential difference which is indicated by voltmeter 36 will (as illustrated schematically in FIG. 5) reach a maximum when the holiday 13 is directly opposite electrode 24, a minimum when holiday 13 is directly opposite electrode 27, and a second maximum when holiday 13 is directly opposite electrode 25.

FIG. 3 illustrates an alternative wiring arrangement which may be used to obtain different results as the probe 23 is moved past the holiday 13 in the coating 11. Thus in FIG. 3, the voltmeter 36 is connected between electrodes 24 and 25 and the holiday 13 via the pipe 10. With this arrangement, the voltage indicated by voltmeter 36 varies substantially inversely to the voltage which is indicated by the voltmeter 36 in the circuit shown in FIG. 2. Therefore, as the electrode 24 moves to a position directly opposite the holiday 13, a minimum voltage will be indicated by the voltmeter 36. As the probe continues to move upwardly in the pipe 10, the indicated voltage will gradually increase, reaching a maximum value as the electrode 27 moves into horizontal alignment with the holiday 13. The indicated voltage will then again decline and reach a second minimum value as the holiday 13 becomes oppositely disposed with respect to electrode 25.

As the probe 23 is raised or lowered in the coated pipe 10, the potential indicated between the holiday 13 and the electrode to which the voltmeter 36 is connected is continuously read and recorded. Simultaneously, readings are made and recorded of the distance between the central electrode 27 and the bottom or top of the string of pipe 10 under test. The potential readings taken from voltmeter 36 are then plotted as a function of the distance of the electrode 27 from the bottom or top of pipe 10. The chart obtained in this manner will be essentially a straight line except when the electrodes 24, 25 and 27 are pulled past a holiday, at which time the indicated potential difference will reach maximum and minimum values in the manner which has been described and schematically illustrated in FIG. 5.

Changes may be made in the combination and arrangement of parts or elements, as well as in steps and procedures, as heretofore set forth in the specification and shown in the drawings, it being understood that changes may be made in the embodiments disclosed without departing from the spirit and scope of the invention as defined in the following claims.

We claim:
1. A method of locating holidays in an internal coating of insulating material in a tubular member, comprising the steps of:
   (a) filling the tubular member with an electrolyte,
   (b) supporting three electrodes in the tubular member in substantially equally spaced apart relation substantially along the centerline of the tubular member,
   (c) imposing one potential on the centrally positioned electrode and a second, different potential on the endmost electrodes to provide a potential gradient in the electrolyte between said electrodes,
   (d) moving the electrodes in their spaced relation through the tubular member, and
   (e) registering variations in the potential difference between at least one of said electrodes and the tubular member during movement of said electrodes through the tubular member.

2. The method defined in claim 1 wherein the variations in potential difference between the centrally positioned electrode and the tubular member are registered.

3. The method defined in claim 1 wherein the variations in potential difference between the endmost electrodes and the tubular member are registered.

4. In combination:
   (a) A tubular member having a coating of insulating material on the inside surface thereof,
   (b) An electrolyte filling the tubular member,
   (c) An elongated probe of a size for lengthwise movement through the tubular member,
   (d) Means for moving said probe through said tubular member,
   (e) Said probe comprising three electrodes axially spaced with respect to said tubular member, one of said electrodes being positioned approximately midway between the other two electrodes,
   (f) Said electrodes being in electrical contact with said electrolyte and out of physical contact with the coating of said tubular member,
   (g) Means for imposing one electrical potential on the centrally positioned electrode and a second, different, potential on both of the remaining two electrodes, and
   (h) Means for registering variations in a parameter of the resistance between the centrally positioned electrode and the tubular member.

5. In combination:
   (a) A tubular member having a coating of insulating material on the inside surface thereof,
   (b) An electrolyte filling the tubular member, (c) An elongated probe of a size for lengthwise movement through the tubular member,
(d) Means for moving said probe through said tubular member,
(e) Said probe comprising three electrodes axially spaced with respect to said tubular member, one of said electrodes being positioned approximately midway between the other two electrodes,
(f) Said electrodes being in electrical contact with said electrolyte and out of physical contact with the coating of said tubular member,
(g) Means for imposing one electrical potential on the centrally positioned electrode and a second, different, potential on both of the remaining two electrodes, and
(h) Means for registering variations in the parameter of the resistance between the outer two electrodes and the tubular member.

6. The combination of claim 4 in which the tubular member is vertically disposed in an oil well.

7. The combination of claim 5 in which the tubular member is vertically disposed in an oil well.

References Cited by the Examiner

UNITED STATES PATENTS

| | | | |
|---|---|---|---|
| 2,242,612 | 5/41 | Leonardson | 324—10 X |
| 2,273,363 | 2/42 | Lipson | 324—1 |
| 2,297,837 | 10/42 | Loughnane | 324—54 |
| 2,428,034 | 9/47 | Nichols et al. | 324—10 |
| 2,476,137 | 7/49 | Doll | 324—10 X |
| 2,581,979 | 1/52 | Standing et al. | 324—10 X |
| 2,615,077 | 10/52 | Tinker | 324—54 |
| 2,826,736 | 3/58 | Doll | 324—10 X |
| 2,978,637 | 4/61 | Price et al. | 324—54 |

WALTER L. CARLSON, *Primary Examiner.*

SAMUEL BERNSTEIN, *Examiner.*